(12) United States Patent
Zaiser et al.

(10) Patent No.: US 6,510,747 B1
(45) Date of Patent: *Jan. 28, 2003

(54) FLOW CONTROL DEVICE

(75) Inventors: LeNoir E. Zaiser; Kevin Confoy, both of Naples, FL (US)

(73) Assignee: Inovo, Inc., Naples, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/556,225

(22) Filed: Apr. 24, 2000

Related U.S. Application Data

(63) Continuation-in-part of application No. 08/941,356, filed on Sep. 30, 1997, now Pat. No. 6,053,056.
(60) Provisional application No. 60/029,624, filed on Oct. 25, 1996.

(51) Int. Cl.[7] .................................................. G01F 1/42
(52) U.S. Cl. ..................................... 73/861.61; 251/205
(58) Field of Search ........................ 73/861.61, 861.62; 251/205, 206, 207, 210

(56) References Cited

U.S. PATENT DOCUMENTS

| | | | |
|---|---|---|---|
| 2,649,670 A | 8/1953 | Martin et al. ................. | 51/281 |
| 2,971,250 A | 2/1961 | Wahlin ......................... | 29/157 |
| 4,445,808 A | 5/1984 | Arya ............................ | 405/259 |
| 4,572,477 A | 2/1986 | Phlipot et al. ............... | 251/285 |
| 4,909,476 A | 3/1990 | Messick ....................... | 251/206 |
| 5,036,879 A | 8/1991 | Ponci .......................... | 137/496 |
| 5,593,136 A | 1/1997 | Reed et al. .................. | 251/366 |
| 5,614,679 A | 3/1997 | Johnson ........................ | 73/756 |
| 5,640,997 A | 6/1997 | Reed et al. .................. | 137/881 |
| 6,053,056 A | * 4/2000 | Zaiser et al. ............. | 73/861.61 |
| 6,202,304 B1 | 3/2001 | Shatz ........................ | 29/896.6 |

OTHER PUBLICATIONS

Transcript of Preliminary Injunction Hearing, Cause No. IP97–1367–C H/G (S.D. Ind. Mar. 18, 1998), pp. 1–4, 41–48, 133–136 (esp. pp. 134, 1. 23–135, 1. 11: Testimony of Gilbert Davidson, Chairman of Flotec, Inc.).

* cited by examiner

*Primary Examiner*—Benjamin R. Fuller
*Assistant Examiner*—C Dickens
(74) *Attorney, Agent, or Firm*—Hamilton, Brook, Smith & Reynolds, P.C.

(57) ABSTRACT

Semi-spherical supports are used in the piercing of small, consistently sized holes in a soft metal. In particular, a flow control device, such as an orifice plate, can be fabricated with small, consistently sized flow apertures to regulate flow in a gas flow regulating device. By using semi-spherical supports, the need for hand-punching and real-time flow calibration can be avoided and automated machinery with a tapered piercing tool can be used to fabricate the flow control device.

46 Claims, 5 Drawing Sheets

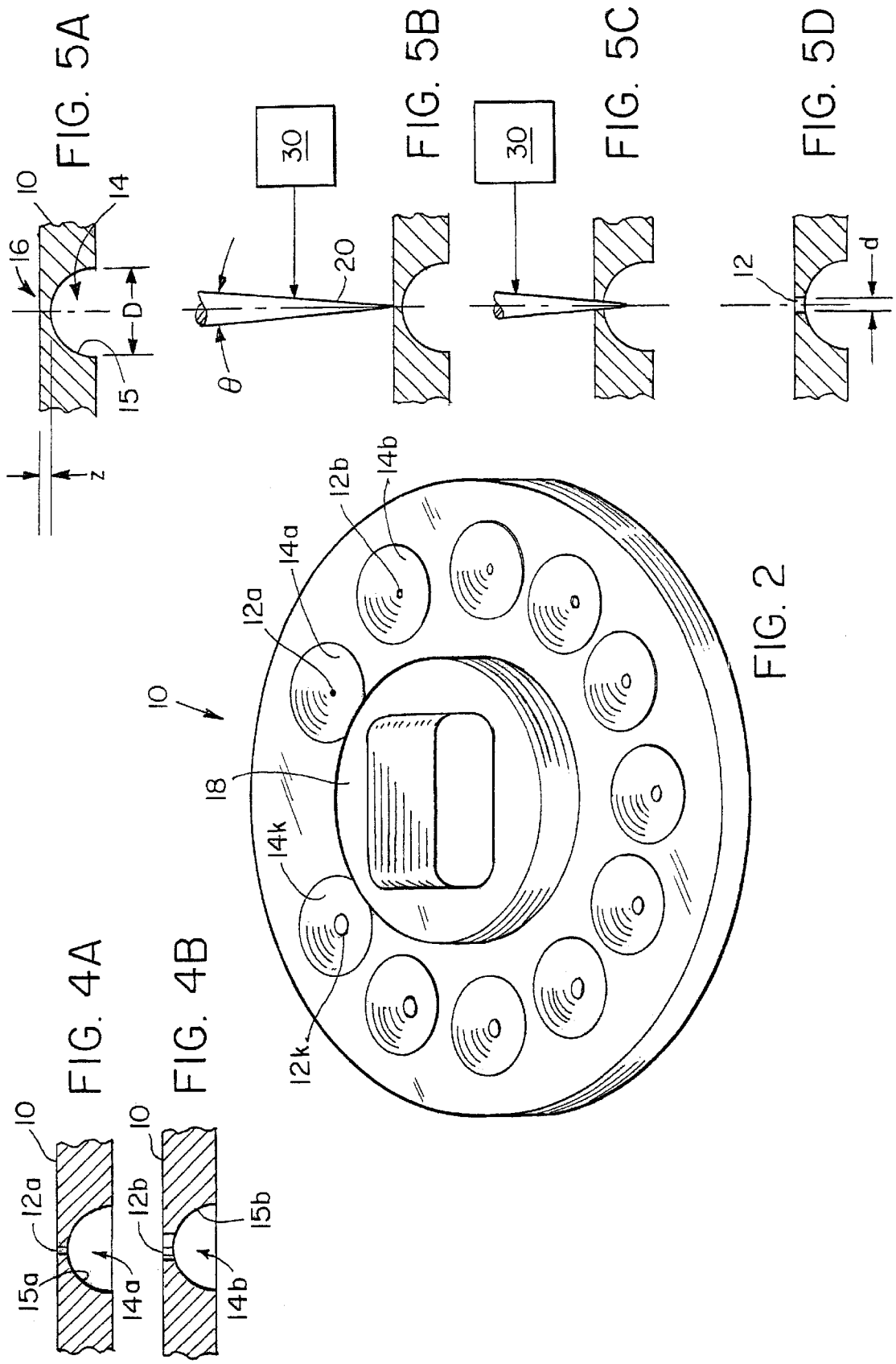

FLOW CONTROL DEVICE

RELATED APPLICATIONS

This application is a Continuation-In-Part of U.S. application Ser. No. 08/941,356, filed on Sep. 30, 1997 (now U.S. Pat. No. 6,053,056), which claims priority to U.S. Provisional Application No. 60/029,624 filed on Oct. 25, 1996, the teachings of which are incorporated herein by reference in their entirety.

BACKGROUND

In a medical setting, oxygen can be delivered to a patient from a cryogenic vessel, high pressure gas storage vessel or other controlled pressure delivery sources, such as a hospital delivery system. Such an oxygen delivery system includes an adjustable flow regulator to select a flow rate of oxygen to the patient. Adjustable flow regulators typically include a circular orifice plate having a plurality of apertures of varying sizes through which the oxygen can flow.

In order to create an aperture that allows a certain flow rate, users of prior art techniques typically create an undersized aperture using a hand tool, measure the flow rate, and subsequently increase the aperture size and measure the flow rate until gas flows at the desired rate. Other prior art methods utilize needle valves, stamping or compression of a large aperture, fabrication and assembly of discrete components, blockage of a flow conduit by a ball or tapered pin, photoetching of a thin metal disk that is subsequently attached to a thicker plate, or other largely manual methods.

To obtain an accurate flow rate, a real-time flow measurement is therefore made of each aperture during fabrication. Because this is largely a manual process, accurate registration is difficult to achieve, sometimes yielding a secondary aperture proximate to the main aperture to produce the proper flow rate. If the flow rate of a particular aperture is greater than a desired flow rate, then the entire part is rejected.

SUMMARY

Prior art techniques suffer from at least two disadvantages. First, they are time-consuming and labor intensive processes. Second, they do not take full advantage of the fact that flow rates are proportionally related to hole sizes.

Orifice plates can be manufactured having flow apertures that are formed to have accurate dimensions. As such, real-time measurement and repair is unnecessary. Consequently, every orifice plate can be identically fabricated, within allowed tolerances, using automated machinery. In addition, a complete flow control device can be manufactured from a single piece of material—the orifice plate.

An orifice plate can include a rigid circular plate of material, such as brass or other soft metal, having a first (bottom) surface and a second (top) surface. A counter bore can yield a domed support structure in the material at each flow aperture location. Specifically, the domed support structure can have a partial ellipsoidal, or conical shape. In accordance with one aspect, the domed support structure has a semi-spherical shape. The counter bore thus defines a support structure having an open base at the first (bottom) surface and an apex proximate to the second (top) surface. Prior art attempts at piercing thin-walled orifice plates have failed due to the lack of such a support.

A flow aperture can then be formed through the material from the second (top) surface and registered to the apex of the support structure. In particular, there may be a plurality of apertures, each aperture having a respective size and registered to an apex of a respective support structure.

The support structures and the apertures can be created by a computer-controlled machine. In particular, the computer can control a piercing tool which is automatically registered to the apex of the support structure and inserted through the thinned material to form the flow aperture. By using a computer-controlled process, orifice plates can be repeatedly reproduced to be substantially identical, within permitted tolerance.

In accordance with a particular embodiment of the invention, the orifice plate can be used in a flow regulator. In a flow regulator, an inflow conduit provides oxygen or another gas at a substantially constant pressure and an outflow conduit provides the gas at a specific flow rate. The orifice plate is coupled between the inflow conduit and the outflow. In particular, the flow regulator can adjustably control the flow of medical oxygen from a supply vessel to a patient. In such an application, the flow apertures vary in size from about 0.0007 square millimeters or less to about 0.8 square millimeters and the thickness of plate material at the apex of the dome structure is about 0.1 millimeter. Flow rates of 1/32 liters per minute (lpm) can be reliably achieved from a 50 pounds per square inch (psi) oxygen supply. Other dimensions can be used for other applications.

BRIEF DESCRIPTION OF THE DRAWINGS

The above and other features of the flow control device, including various novel details of construction and combination of parts, will now be more particularly described with reference to the accompanying drawings and pointed out in the claims. It will be understood that the particular flow control devices embodying the invention are shown by illustration only and not as a limitation of the invention. In the accompanying drawings, like reference characters refer to the same parts throughout the different views. The drawings are not necessarily to scale, emphasis instead being placed upon illustrating the principles of the invention. The principles and features of the invention may be embodied in varied and numerous embodiments without departing from the scope of the invention.

FIG. 2 is a bottom-side perspective view of a particular orifice plate.

FIGS. 4A–4B are cross-sectional diagrams of a support structure having a first and second flow aperture of FIG. 2, respectively.

FIGS. 5A–5D are process flow diagrams of a particular method of forming the flow apertures of FIG. 2.

DETAILED DESCRIPTION

Figure 1A:
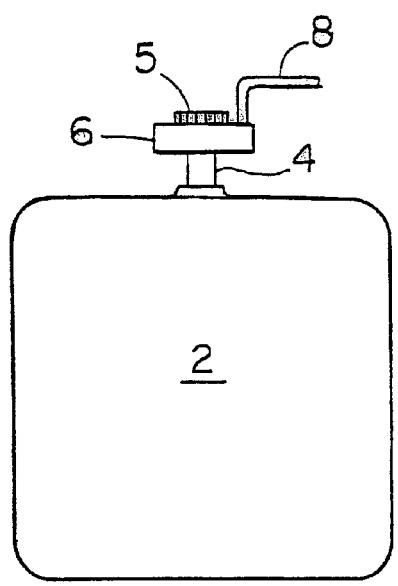
FIGS. 1A–1B are a simplified perspective view of a typical cryogenic and high pressure supply vessel, respectively.
Figure 1B:
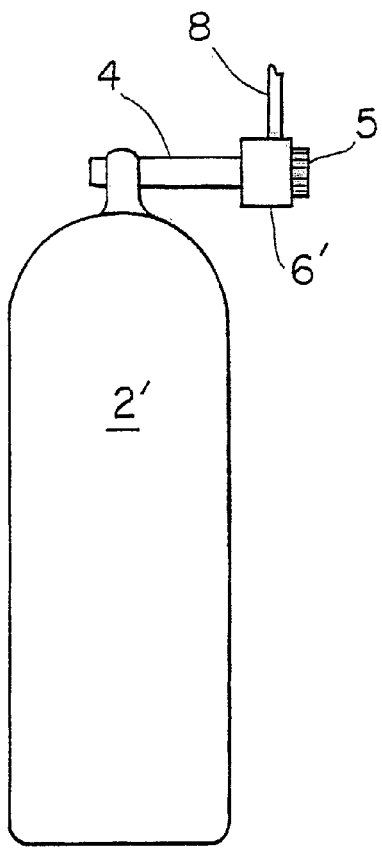

FIGS. 1A–1B are a perspective view of a typical cryogenic and high pressure supply vessel, respectively. The vessel 2, 2' can be an oxygen supply vessel. An adjustable flow regulator 6, 6' is coupled to a supply conduit 4 from the vessel 2, 2'. Within the flow regulator 6, 6' is a circular orifice plate (described below), which can have a plurality of discrete flow settings. Each flow setting is registered to a respective flow aperture. Each aperture supports a specific flow rate through an outflow conduit 8, 8', as indicated by the setting of an adjusting dial 5.

FIG. 2 is a bottom-side perspective view of a particular orifice plate 10. As illustrated, the orifice plate includes eleven flow apertures 12a–12k corresponding to eleven discrete flow settings. Each flow aperture 12a–12k has a respective flow area corresponding to a preselected flow rate. An optional mounting hub 18 can be utilized to register the orifice plate 10 to the adjusting dial 5 (FIG. 1). Although eleven flow apertures are illustrated, corresponding to eleven selectable flow rates, a greater number or a smaller number of flow apertures 12 can be provided, depending on the intended application.

In some applications, only one flow aperture 12 may be required. In such applications either a fixed flow rate is specified or the flow rate may be adjusted by varying the supply pressure of the gas. In any event, the flow control device may be fabricated integrally with the regulator body—without a separate, rotatable orifice plate.

Figure 3:
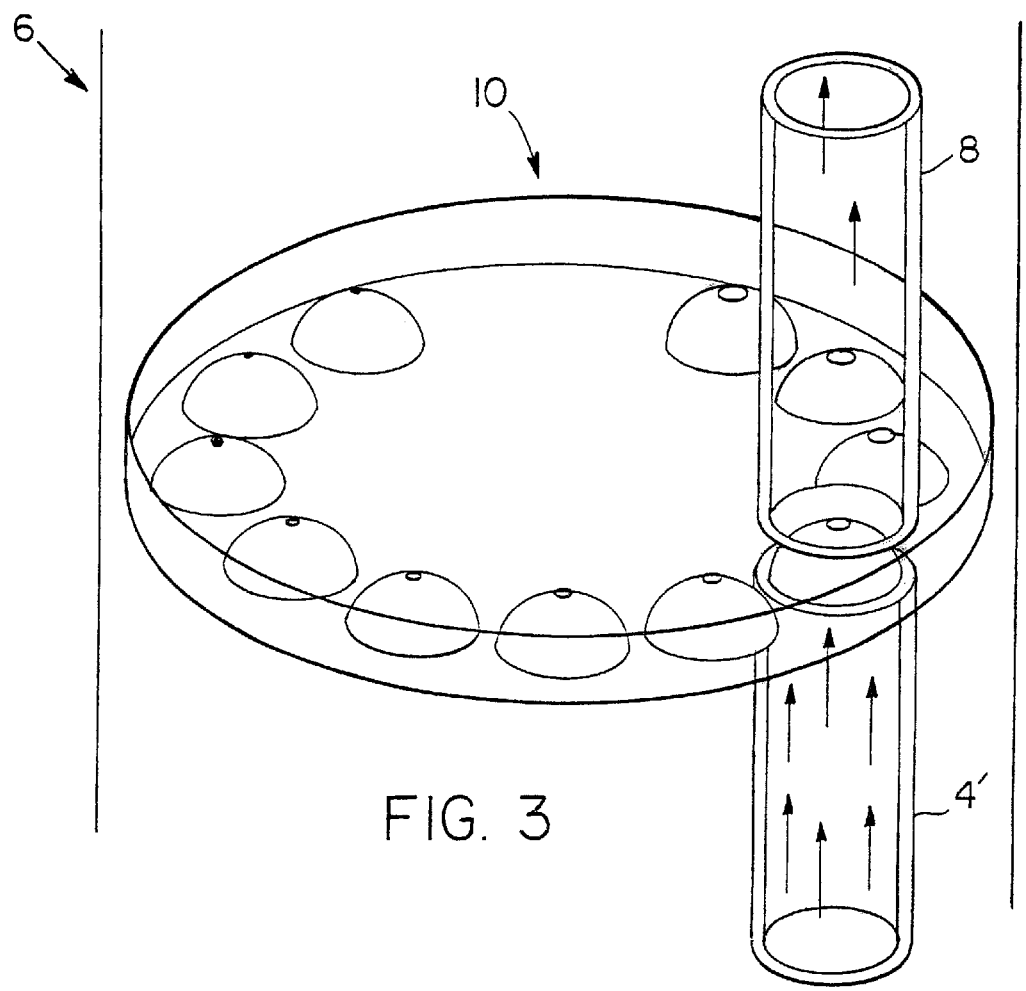
FIG. 3 is a schematic diagram of a particular orifice plate embodied in an illustrative flow regulator.

FIG. 3 is a schematic diagram of a particular orifice plate 10 embodied in an illustrative flow regulator 6. The orifice plate 10 separates a supply conduit 4 supplying gas at an essentially constant operating pressure from an outflow conduit 8. It will be understood that the orientation of the orifice plate can be reversed from that shown. The illustrated orientation, however, offers particular advantages. First, the piercing tool deflects the orifice plate material into the counter bore 14. That deflected material tends to create a particulate matter trap, as will be discussed below.

It will also be understood that the orifice plate 10 can be adapted for use in any flow regulator which uses a prior art orifice plate. Particular embodiment of flow regulators having an orifice plate as described herein are commercially available from Inovo, Inc. of Naples, Fla. Specific examples of Inovo regulators are described in U.S. application Ser. No. 09/342,953 (filed Jun. 29, 1999), U.S. Provisional Application No. 60/091,127 (filed Jun. 29, 1998), U.S. Provisional Application No. 60/119,745 (filed Feb. 9, 1999), U.S. Provisional Application No. 60/124,704 (filed Mar. 15, 1999), and U.S. Provisional Application No. 60/127,961 (filed Apr. 6, 1999), the teachings of which are all incorporated herein by reference in their entirety.

Returning to FIG. 2, each flow apertures 12a–12k is centered relative to a respective counter bore 14a–14k. As viewed from the bottom side, the counter bores 14a–14k create a domed support structure from the plate material. As the term is used herein, a domed structure is a three-dimensional structure having an open base and a wall tapering to an apex. Examples of dome wall shapes include partial ellipsoidal shapes, such as semi-spheres and elliptic paraboloids, and conical shapes. A cross-section taken through the apex reveals an arched-shape support wall, which can include semicircular, semi-oval, or triangular shapes. Other suitable shapes may be found by routine experimentation.

FIGS. 4A–4B are cross-sectional diagrams of a first and a second flow aperture 12a, 12b of FIG. 2, respectively. As illustrated, both flow apertures 12a, 12b have a circular flow area and the first flow aperture 12a has a smaller diameter than the second flow aperture 12b. As illustrated, the principle axis of each flow aperture 12a, 12b is registered to a respective apex of a domed structure 14a, 14b having a semi-spherical wall 15a, 15b. Precise registration between the flow apertures 12a, 12b and the apex of the domed structures 14a, 14b, however, is not critical.

A primary purpose of the domed support is to allow rapid, automatic piercing of apertures to provide a specified flow rate, such between at least about 0.03 millimeter (0.001 inch) and 1 millimeter (0.039 inch) in diameter. The predictability of the disclosed method is particularly important for forming the smaller apertures for the lowest flow rates. The smaller diameter apertures are especially useful in pediatric medical oxygen regulators, where low flow rates may be desired. Using the disclosed fabrication method, small aperture sizes, and thus low flow rates, can be obtained that cannot be realized using other known methods. For example, oxygen flow rates of less than 1/4 lpm, at least down to 1/32 lpm, can be reliably obtained from an operating pressure of 50 psi, using the disclosed method. Precision flow apertures with tight tolerances ensures that the most vulnerable patients, including premature infants, can receive an appropriate and accurate dosage of oxygen.

When a tapered tool is employed, the computer controls the size of the aperture by controlling the depth of the pierce. This eliminates the need for hand-piercing and real-time flow calibration, which are necessary without the use of domed supports. Instead, the flow apertures 12 can be fabricated using automated piercing machinery.

Although prior art techniques have included counter bores, they used relatively large cylindrical-shaped counter bores. Those counter bores were used to thin a region of the plate material and a flow aperture was then formed through this thinned material. Because of the relatively large target area of the thinned material (i.e., an area of a substantially constant thickness), precise alignment between a piercing tool and the bore was not required. Due to flex and rebound of the relatively thin material being pierced, however, the size of each aperture, and therefore its flow rate, could not be accurately achieved. The machining of the relatively large cylindrical-shaped counter bores also tends to warp and weaken the extended thinned area of material, which also affects the size of the flow apertures.

It should be noted that the domed support structure 14, however, can have a flat ceiling. That is, there can be a thinned region of relatively constant thickness between the top of the counter bore and the top surface of the plate. That flat ceiling, however, is limited in size so as to inhibit warping during machining and significant flexing and redounding during the piercing operation. In fact, as the area of the flat ceiling approaches the area of the flow aperture, tapering of the walls may be unnecessary. Those dimensions can vary depending on the thickness of the thinned material and the size of the desired flow aperture. This implies that the counter bores may not be identical. Each counter bore dimension would ideally accommodate one (or a few) flow aperture dimension.

FIGS. 5A–5D are process flow diagrams for creating a particular flow aperture in accordance with the invention. The area of material 16 being pierced should be sufficiently thin to allow a tool to make a hole without breaking the material or a piercing tool 20. To facilitate that task, the orifice plate is made of brass or another soft metal. The thinned material may be less than about 0.3 millimeter (0.01 inch) thick. To achieve this thickness, as illustrated in FIG. 5A, a counter bore 14 having a diameter D of about 3.2 millimeters (0.125 inch) is applied to the orifice plate 10 of greater thickness. The distance z between the apex of the wall 15 and the opposite surface 16 of the orifice plate 10 is then thinned to about 0.1 millimeter (e.g., 0.0035 inch). It will be understood that the exact dimensions are a design choice of the user and can depend on the materials used for the orifice plate 10 and the piercing tool 20.

Referring to FIG. 5B, the piercing tool 20 is placed in position under the control of an automated machine 30. Specifically, the central axis of the piercing tool 20 is registered with the apex of the semi-spherical void 14. The piercing tool 20 can have a conical, pyramidal or other shape suitable for piercing the orifice plate 10. As illustrated, the piercing tool 20 is tapered at an angle, which can be chosen by the user. For example, the angle can be suitably chosen to be about 7–10 degrees.

Referring to FIG. 5C, the piercing tool 20 is forced into the orifice plate 10. As the piercing tool 20 goes deeper, a larger hole is created. By using a semi-spherical support, there is little or no flex or resulting rebound from applying the piercing tool 20 to the structure. Downward forces are dispersed down the wall into progressively thicker material.

Referring to FIG. 5D, a circular flow aperture 12 having a diameter d has been created using a conical piercing tool 20. For example, the flow aperture 12 can have a diameter d of 1 millimeter±0.006 millimeter (e.g., 0.003 inch±0.0002 inch). By using a semi-spherical support, the required tool depth to achieve a given aperture diameter is predictable, which permits the automated fabrication of flow apertures. Although the aperture 12 is illustrated as having a circular flow area, the actual shape of the aperture 12 depends on the shape of the piercing tool 20. Accordingly, the flow aperture 12 can have a circular, oval, polygonal or any other suitable shape.

In accordance with a particular embodiment, both the counter bores 14 and the flow apertures 12 are formed using a single Computer Numerical Control (CNC) machine. Sample orifice plates are selected for quality control inspection, which includes off-line flow rate measurements.

Figure 6:
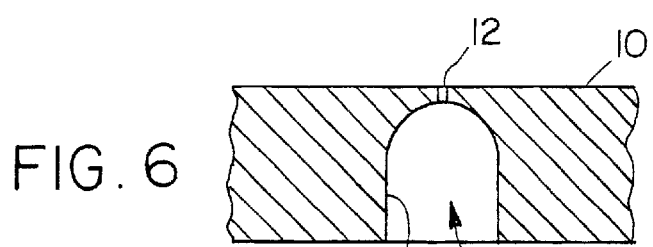
FIG. 6 is a cross-sectional diagram of another embodiment of a support structure.

FIG. 6 is a cross-sectional diagram of another embodiment of a support structure. As illustrated, a counter bore 14' yields an ellipsoidal-walled support structure 15' in the plate material 10. Note that as the diameter of the counter bore 14' approaches the diameter of the flow aperture 12, the tapered section of the wall will be destroyed by the piercing tool.

Figure 7:
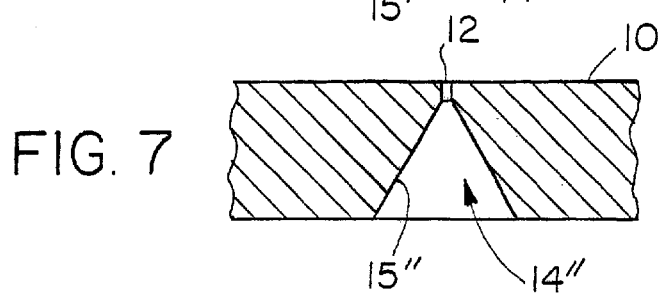
FIG. 7 is a cross-sectional diagram of yet another embodiment of a support structure.

FIG. 7 is a cross-sectional diagram of yet another embodiment of a support structure. As illustrated, a counter bore 14" yields a conical-walled support structure 15" in the plate material 10. Such an embodiment may be particularly useful for supporting extremely small flow apertures.

Figure 8:
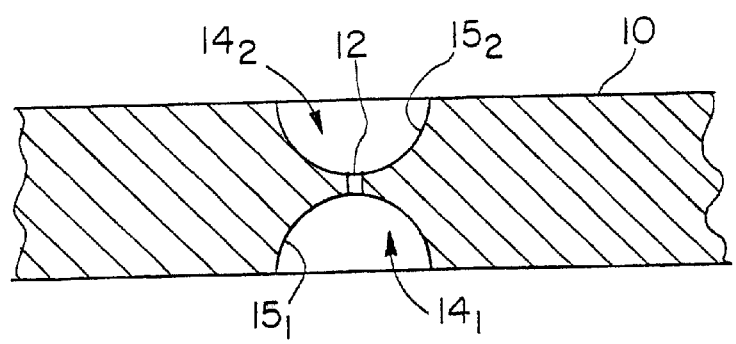
FIG. 8 is a cross-sectional diagram of still another embodiment of a support structure.

FIG. 8 is a cross-sectional diagram of yet another embodiment of a support structure. As illustrated, two opposing counter bores $14_1$, $14_2$ are formed in the plate material 10. The flow aperture 12 is formed by piercing the thinned plate material between the apexes of the counter bores $14_1$, $14_2$. Although the counter bores $14_1$, $14_2$ are illustrated as having semi-circular walls $15_1$, $15_2$, any of the aforementioned shapes or combinations can be substituted.

Figure 9:
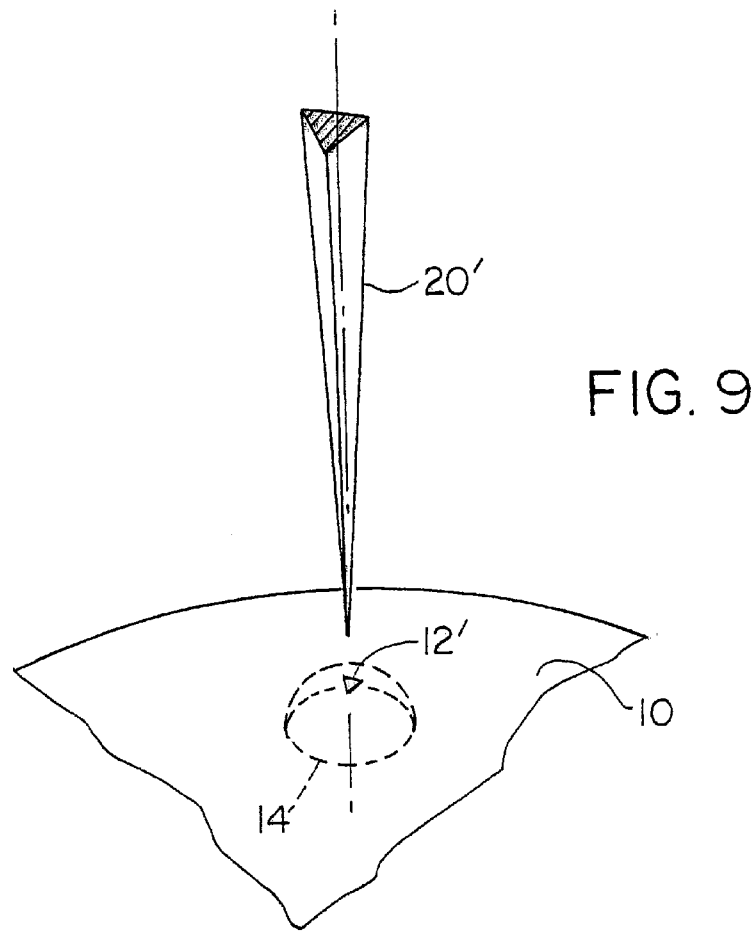
FIG. 9 is a perspective view of a particular embodiment of the invention employing a pyramidal piercing tool.

FIG. 9 is a perspective view of a particular embodiment employing a pyramidal piercing tool 20'. As illustrated, the piercing tool 20' yields a triangular aperture 12' in the plate material 10. The aperture 12' is centered on the apex of a respective counter bore 14 (shown in phantom). Although the pyramidal piercing tool 20' is shown as having three sides, it will be understood that the piercing tool 20' can have a greater number of sides.

Figure 10:
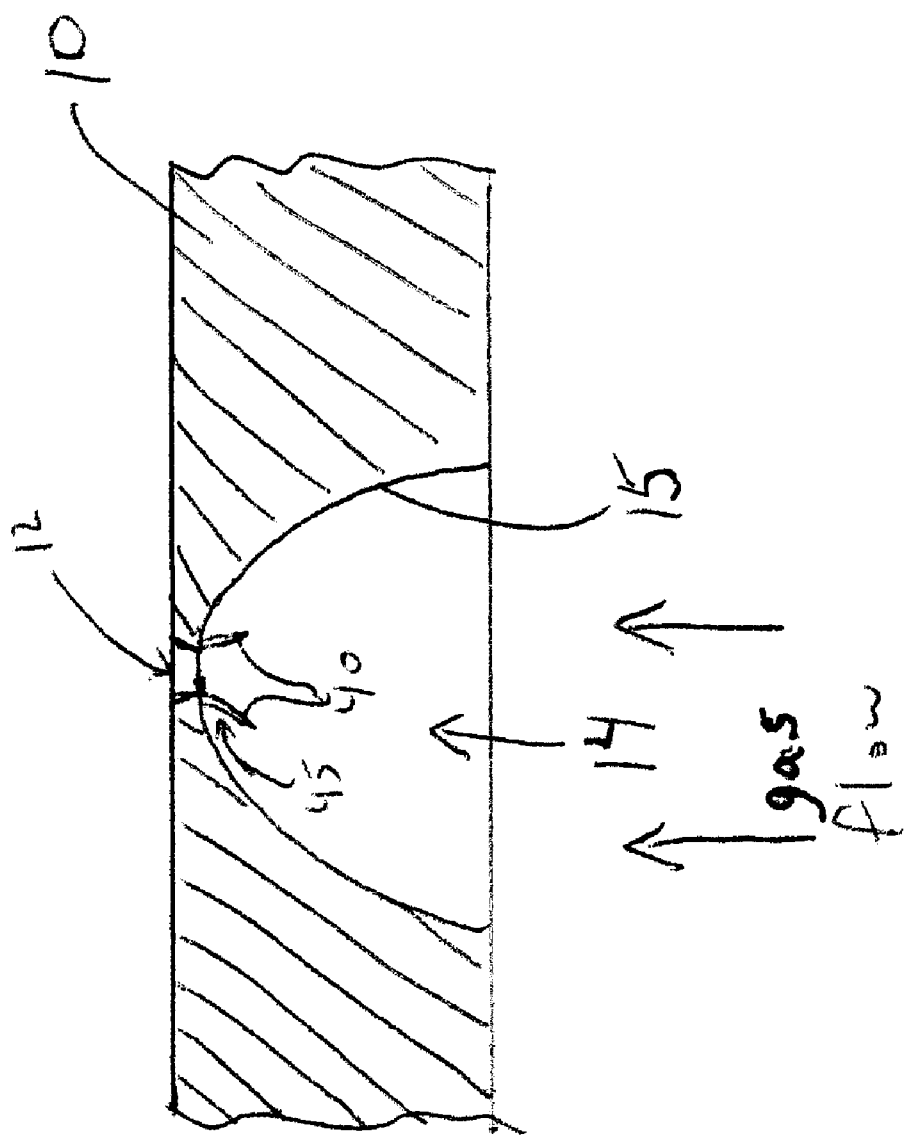
FIG. 10 is a cross-sectional diagram of a formed flow aperture showing a particulate matter trap.

FIG. 10 is a cross-sectional diagram of a formed flow aperture showing a particulate matter trap. The piercing operation does not necessarily remove material. Instead, the piercing tool 20 ruptures the thinned material 10 to form the flow aperture 12. This operation forces shards of material 40 downward into the void 14. Those shards of material 40 project outward from the wall 15 to create pockets 45. When the gas flow is from the bottom to the top, as shown, the pockets 45 operate to trap particulate matter that may be in the gas flow, thereby inhibiting the transfer of such particulate matter through the flow aperture 12.

An added advantage of forming the flow aperture 12—instead of machining it is that the top surface 16 of the orifice plate is smooth. A machined (e.g. drilled) aperture would have burrs. Without such a sharp boundary, the orifice plate described herein does not require additional finishing and can directly interface with o-rings in an assembled regulator—without damaging the o-ring. That advantage further reduces part counts and manufacturing steps.

Equivalents

While the flow control device has been particularly shown and described with reference to particular embodiments, it will be understood that those skilled in the art that various changes in form and detail can be made without departing from the spirit and scope of the invention as defined by the appended claims. For example, a flow control device made in accordance with the invention can be used in other gas or liquid flow devices.

These and all other equivalents are intended to be encompassed by the following claims.

What is claimed is:

1. A flow control device comprising:
    a rigid plate of material having a top surface and a bottom surface;
    a domed support structure machined in the plate from the bottom surface to create a thinned area of material; and
    an aperture formed through the thinned area from the top surface and registered to the support structure.

2. The device of claim 1 wherein there are a plurality of apertures annularly spaced around the plate, each aperture registered to a respective support structure.

3. The device of claim 2 wherein the support structures are substantially identical.

4. The device of claim 2 wherein each aperture has a respective dimension.

5. The device of claim 1 wherein the aperture has a polygonal shape.

6. The device of claim 1 wherein the support structure has a partial ellipsoidal shape.

7. The device of claim 1 wherein the material is a soft metal.

8. The device of claim 1 wherein the aperture is coaxially registered to an apex of the support structure.

9. The device of claim 1 wherein the support structure comprises opposing counter bores in the plate and the aperture extends through the plate between the opposing counter bores.

10. The device of claim 1 wherein the aperture is formed to yield a selected flow of a medium introduced at a substantially constant input pressure.

11. The device of claim 1 wherein the thinned area of material measures about 0.3 mm.

12. The device of claim 1 wherein the thinned area of material measures between about 0.1 and 0.3 mm.

13. An apparatus for metering the flow of a gas, comprising:
    an inflow conduit for providing a gas at an operating pressure;

an outflow conduit for providing the gas at an output flow rate; and a flow control device coupled between the inflow conduit and the outflow conduit, the flow control device comprising:
 a rigid plate of material having a top surface and a bottom surface;
 a domed support structure machined in the plate from the bottom surface to create a thinned area of material; and
 an aperture formed through the thinned area from the top surface and registered to the support structure.

14. The apparatus of claim 13 wherein the material is a soft metal.

15. The apparatus of claim 13 wherein the flow control device comprises a support structure having a partial ellipsoidal shape.

16. The apparatus of claim 15 wherein the shape includes semi-spherical.

17. The apparatus of claim 13 wherein the flow control device comprises a support structure having a conical shape.

18. The apparatus of claim 13 wherein the flow control device includes a plurality of apertures annularly spread around the plate, each aperture registered to a respective support structure.

19. The apparatus of claim 18 wherein the aperture has a polygonal shape.

20. The apparatus of claim 13 wherein the aperture of the aperture has a flow area computed based on a desired output flow rate through the flow control device.

21. The apparatus of claim 20 wherein the output flow rate is less than 1/4 lpm from a 50 psi operating pressure.

22. The apparatus of claim 20 wherein the output flow rate is about 1/32 lpm from a 50 psi operating pressure.

23. The apparatus of claim 13 wherein the aperture is coaxially registered to an apex of the support structure.

24. The apparatus of claim 13 wherein the support structure comprises opposing counter bores in the plate and the aperture extends through the plate between the opposing counter bores.

25. The apparatus of claim 13 wherein the thinned area of material measures about 0.3 mm.

26. The apparatus of claim 13 wherein the thinned area of material measures between about 0.1 and 0.3 mm.

27. The apparatus of claim 13 wherein the flow control device is moveable to position a selected aperture in communication with the inflow conduit and the outflow conduit.

28. The apparatus of claim 27 wherein the bottom surface of the plate faces the inflow conduit.

29. The apparatus of claim 13 wherein the flow control device includes a particulate matter trap extending from the aperture.

30. A method for metering the flow of a gas, comprising:
 providing a gas at an operating pressure through an inflow conduit;
 providing the gas at an output flow rate through an outflow conduit; and
 coupling a flow control device between the inflow conduit and the outflow conduit, the flow control device comprising:
  a rigid plate of material having a top surface and a bottom surface;
  a domed support structure machined in the plate from the bottom surface to create a thinned area of material; and
  an aperture formed through the thinned area from the top of the surface and registered to the support structure.

31. The method of claim 30 wherein the material is a soft metal.

32. The method of claim 30 wherein the flow control device comprises a support structure having a partial ellipsoidal shape.

33. The method of claim 32 wherein the shape includes semi-spherical.

34. The method of claim 30 wherein the flow control device comprises a support structure having a conical shape.

35. The method of claim 30 wherein the flow control device comprises a plurality of apertures annularly spaced about the plate, each aperture registered to a respective support structure.

36. The method of claim 30 wherein the aperture has a polygonal shape.

37. The method of claim 30 wherein the aperture has a flow area computed based on a desired output flow rate through the aperture from a given operating pressure.

38. The method of claim 37 wherein output flow rate is less than 1/4 lpm from a 50 psi operating pressure.

39. The method of claim 37 wherein the output flow rate is about 1/32 lpm from a 50 psi operating pressure.

40. The method of claim 30 wherein the aperture is coaxially registered to an apex of the support structure.

41. The method of claim 30 wherein the support structure comprises opposing counter bores in the plate, the aperture formed through the plate between the opposing counter bores.

42. The method of claim 30 wherein the flow control device includes a particulate matter trap extending from the aperture.

43. The method of claim 30 wherein the thinned area of material measures between about 0.1 and 0.3 mm.

44. The method of claim 30 wherein the flow control device is moveable to position a selected aperture in communication with the inflow conduit and the outflow conduit.

45. The method of claim 44 wherein the bottom surface if the plate faces the inflow conduit.

46. The method fo claim 30 wherein the flow control device includes a particulate matter trap extending from the aperture.

* * * * *

UNITED STATES PATENT AND TRADEMARK OFFICE
CERTIFICATE OF CORRECTION

PATENT NO. : 6,510,747 B1  
DATED : January 28, 2003  
INVENTOR(S) : LeNoir E. Zaiser and Kevin Confoy It is certified that error appears in the above-identified patent and that said Letters Patent is hereby corrected as shown below:

<u>Column 8,</u>  
Line 49, delete "if" and insert -- of --.  
Line 51, delete "fo" and insert -- of --.

Signed and Sealed this

Eighth Day of April, 2003

JAMES E. ROGAN  
*Director of the United States Patent and Trademark Office*